Patented Oct. 27, 1953

2,657,230

UNITED STATES PATENT OFFICE 2,657,230

RESOLUTION OF LYSINE

Arthur O. Rogers, Lewiston, N. Y., assignor to E. I. du Pont de Nemours and Company, Wilmington, Del., a corporation of Delaware No Drawing. Application September 17, 1952, Serial No. 310,129

5 Claims. (Cl. 260—501)

This invention relates to the resolution of lysine and particularly to an improvement of the method in which an optically active glutamic acid is employed as the resolving agent.

Emmick, U. S. Patent 2,556,907, describes a method for resolving mixtures of L-lysine and D-lysine, e. g. DL-lysine, involving fractionally crystallizing the salts of such a mixture with an optically active glutamic acid. The salts which are fractionally crystallized may be those of either D-glutamic acid or L-glutamic acid, those of the latter being preferred. Such salts are readily obtained by reacting, for example, DL-lysine with an optically active glutamic acid, or its ammonium salt, in aqueous solution. When an ammonium glutamate is used, ammonia is liberated and is preferably removed, e. g. by heating, following which fractional crystallization is effected from a methanol-water solvent mixture.

The above patent discloses temperatures in the range 15–30° C. as the preferred and most advantageous temperatures for carrying out the fractional crystallization. It has now been discovered that highly advantageous and surprising results are realized when employing crystallization temperatures which are substantially higher than 30° C. Thus, the use of such higher temperatures permits a marked reduction in crystallization time, which is of considerable value in the economy of the process. Another outstanding advantage is that the resulting product has a markedly improved crystal structure which greatly facilitates its separation from the crystallization mixture.

It is, accordingly, an object of the invention to provide an improved method for resolving lysine. A particular object is to provide an improvement in the resolution method of Emmick as described in U. S. Patent 2,556,907, whereby such method is rendered very much more practical. Further objects will be apparent from the following description.

The objects of the invention are accomplished by carrying out the fractional crystallization step of the Emmick method at a temperature above 40° C.

When the subject crystallization is carried out at 15–30° C., the time required for completion is about 48 hours. Such a long crystallization period is highly disadvantageous in commercial operations. On the other hand, it has been found that when using, for example, a temperature of 60° C., crystallization can be completed in about 8 hours with resultant marked improvement in operations.

A still further and very practical advantage realized when the crystallization is effected at the present higher temperatures is the very marked improvement in crystal structure. Thus at 60° C., crystals about 100–120 microns in length are obtained, and they are substantially free of agglomerates. Such crystals are easily separated from the mother liquor either by filtration or centrifuging. In contrast, crystallization at room temperature yields needles about 10–15 microns long mixed with agglomerates of such crystals. Separation of mother liquor from these crystals is exceedingly slow and difficult, especially when the crystallization is carried out on a relatively large scale.

It has been found that the crystal size is determined by the temperature at which crystallization occurs. Thus, large crystals substantially free of agglomerates cannot be obtained by crystallization at room temperature followed by digestion at a higher temperature. Attempts to realize the improved crystal structure resulting from the present use of high temperatures, by employing other means, e. g. by changing the solvent composition, the degree of agitation or the quantity of seed crystals employed, have all proved unsuccessful. Thus, the use of higher temperatures in accordance with the present invention has been found to be unique in the production of product of improved crystal structure greatly facilitating product separation.

The preferred temperatures for carrying out the fractional crystallization are in the range of 45 to 75° C., a temperature of about 60° C. being most preferred. However, the advantages of the invention are realized to a substantial extent at any temperature exceeding 40° C. Thus, at 45° C. crystals about 55 microns in length are obtained and the rate of crystal growth and of filtration are markedly better than when crystallization is effected at a temperature of 30° C. or lower. At temperatures of 45 and 60° C., respectively, the linear dimensions of the crystals obtained are about 5 and 10 times greater than are the corresponding dimensions of crystals obtained at room temperature. The importance of this feature is evident from the fact that a tenfold increase in linear dimensions results in a thousand-fold increase in crystal volume. Any temperature above 40° C. up to the boiling point of the solvent mixture is beneficial and effective in accordance with the invention. Temperatures above the normal boiling temperature can be used by operating under super-atmospheric pressure.

Successful results depend on the use of a proper solvent combination. In general, the solvent will consist of a mixture of water and methanol. The proportions of these materials to each other and to the lysine glutamate salts should be adjusted to give maximum yield of L-lysine L-glutamate of maximum optical purity. The resolution can be carried out successfully in accordance with this invention employing methanol-water mixtures over the entire solvent composition range cited in the above patent, i. e. solvent mixtures containing from 1 to 20 volumes of methanol per volume of water. At resolution temperatures of 15–30° C., best yields are obtained when the proportion of methanol to water in the solvent ranges from about 1.5:1 to about 5:1 by volume. It has been found that at the present higher resolution temperatures, best yields are obtained when employing solvent containing a somewhat higher proportion of methanol to water than is optimum at room temperature.

The invention is illustrated by the following examples.

*Example 1*

An aqueous solution (216 g.) of DL-lysine containing 33.8% by weight of DL-lysine (73 g., 0.5 mole) was mixed with L-glutamic acid (71.3 g., 0.485 mole) and water (18 g.). The mixture was stirred at room temperature until the glutamic acid had dissolved. The temperature of the mixture was raised to 60° C. and methanol (586 cc.) was added together with 1 g. of L-lysine L-glutamate (for seeding) which had been finely ground in contact with the methanol. The resulting mixture was then stirred at 60° C. for 8 hours during which time L-lysine L-glutamate monohydrate precipitated to form a thick slurry. The precipitated product was filtered off and washed with 250 cc. of aqueous methanol (80% by volume). Washing was repeated with the same volume of 90% and 100% methanol. During filtration and washing, the filter cake was protected from the atmosphere by means of rubber gauze to prevent access of moisture. The L-lysine L-glutamate monohydrate after drying at about 60° C., weighed 63 g.; yield, 79.6%. Its specific rotation as a 12% solution in water at 22° C. was +3.73°, corresponding to an optical purity of about 96%. The crystals, before filtration, were 100–120 microns long.

The following tabulation shows the results for Examples 2 to 9 which were carried out following the general procedure of Example 1 except for the changed conditions indicated in the table. Results for Example 1 are also included for comparison purposes.

| Ex. | Temp., °C. | CH₃OH/H₂O vol. ratio | Lysine glut. conc., percent by wt. | Time, hours | Crystal length, microns | Yield, percent [1] | Optical purity, percent |
|---|---|---|---|---|---|---|---|
| 2 | 25 | 2.72 | 20.2 | 48 | 10–15 | 87.5 | 96 |
| 3 | 25 | 2.86 | 19.6 | 40 | 10–15 | 125 | 72.5 |
| 4 | [2] 45–60 | 2.80 | 19.8 | 18 | 50,60 | 56.6 | 97.5 |
| 5 | 60 | 3.20 | 18.4 | 24 | 100–120 | 55 | 98 |
| 6 | 60 | 3.42 | 18.7 | 25 | 100–120 | 72 | 97 |
| 7 | 60 | 3.64 | 19.0 | 24 | 100–120 | 76 | 100 |
| 1 | 60 | 3.64 | 19.0 | 8 | 100–120 | 79.6 | 96 |
| 8 | 60 | 3.64 | 19.0 | 1 | Grainy | 40.4 | 97 |
| 9 | 60 | 4.00 | 19.35 | 24 | 100–120 | 125 | Low |

[1] Gross yield, based on theoretical L-lysine L-glutamate.
[2] Held at 45° C. for 13.5 hours and at 60° C. for 4.5 hours.

In the above table, Examples 2 and 1 illustrate conditions which produce approximately optimum results at room temperature and at 60° C., respectively. The effect of using higher than optimum methanol:water ratios for the temperatures used is illustrated by Examples 3 and 9. In these experiments partial precipitation of D-lysine and L-glutamate occurred along with the desired L-lysine salt, thus accounting for the yields higher than theory and the low optical purities. The opposite variation, i. e., use of lower than optimum methanol:water ratios, is illustrated by Examples 4, 5 and 6, in which low yields were obtained.

The effect of time in crystallization at 60° C. is shown by Examples 7, 1 and 8. These show that eight hours is sufficient for maximum yield but that one hour is not. The grainy precipitate obtained in Example 8 resulted from the solidification of droplets of L-lysine L-glutamate which precipitated immediately following the addition of methanol. This type of precipitate was also formed initially in the experiments of Examples 7 and 1, but was converted to the usual crystalline form during the digestion period. Example 8 also illustrates the fact that high optical purity in the product obtained at 60° does not require complete precipitation.

In the experiment of Example 5, a photomicrograph of the product at the end of the 45° C. digestion period showed the crystals to be of the order of 55 microns in length and substantially free of agglomerates. In this same experiment, a photomicrograph of the product at the end of the 60° C. digestion period showed that no appreciable change in crystal size had occurred during the latter period.

Since the lysine content of the mother liquor can be recovered, racemized and recycled, low yields in the resolution do not necessarily mean loss of material. However, it is desirable for reasons of overall economy to obtain as high a yield as possible in order to minimize the quantity of material to be rehandled.

The preferred resolving agent is L-glutamic acid, since this agent gives the biologically valuable L-lysine in a state of high optical purity. If D-lysine is desired, the process may be operated in exactly the same manner with D-glutamic acid as resolving agent. If desired, both optical isomers of lysine may be isolated by the alternate use of L- and D-glutamic acid. Thus, DL-lysine may be resolved by means of L-glutamic acid. The mother liquor, which will contain a predominating proportion of D-lysine L-glutamate, may then be treated, e. g. by cation exchange methods, to remove the L-glutamic acid and convert the lysine to the free form. The latter may then be combined with D-glutamic acid and resolved to yield D-lysine D-glutamate. By repeating these steps, substantially all the original lysine may be separated into its optical isomers.

The lysine glutamate precipitate contains lysine and glutamic acid in a 1:1 molar ratio. In preparing the resolution mixture the 1:1 molar ratio of lysine:glutamic acid may be used with excellent results. However, it has been found that even a slight excess of glutamic acid seriously retards crystallization, while excess lysine up to about 10% has no deleterious effect. In order to insure that glutamic acid is not in excess, it is preferred to use a 1–10% excess of lysine. An excess of lysine much greater than 10% results in a reduced yield but is not otherwise harmful. It has also been found that minor quantities of ammonia, e. g. 0.2 mole per mole of lysine, which might be present when ammonium glutamate is used as the source of glutamic acid, has no harmful effect on the process. Higher proportions of ammonia, e. g., 1 mole per mole of lysine, result in reduced yields but are not otherwise deleterious.

This invention provides an improved method for resolving lysine. It is particularly useful in the resolution of lysine to obtain L-lysine which is of value in the supplementation of proteins which are deficient in this amino acid, e. g. proteins of wheat and corn.

I claim:

1. In a process for resolving lysine in which L-lysine and D-lysine salts of an optically active acid glutamic acid are fractionally crystallized from a methanol-water solvent mixture, the improvement comprising carrying out the fractional crystallization at a temperature above 40° C.

2. In a process for resolving lysine in which L-lysine and D-lysine salts of L-glutamic acid are fractionally crystallized from a methanol-water solvent mixture, the improvement comprising carrying out the fractional crystallization at a temperature above 40° C.

3. The method of claim 1 carried out at a temperature of 45–75° C.

4. The method of claim 2 carried out at a temperature of 45–75° C.

5. The method of claim 2 carried out at a temperature of about 60° C.

ARTHUR O. ROGERS.

No references cited.